July 5, 1966     J. M. NOJIRI     3,259,279
COFFEE CAN LID AND HANDLE
Filed March 6, 1964
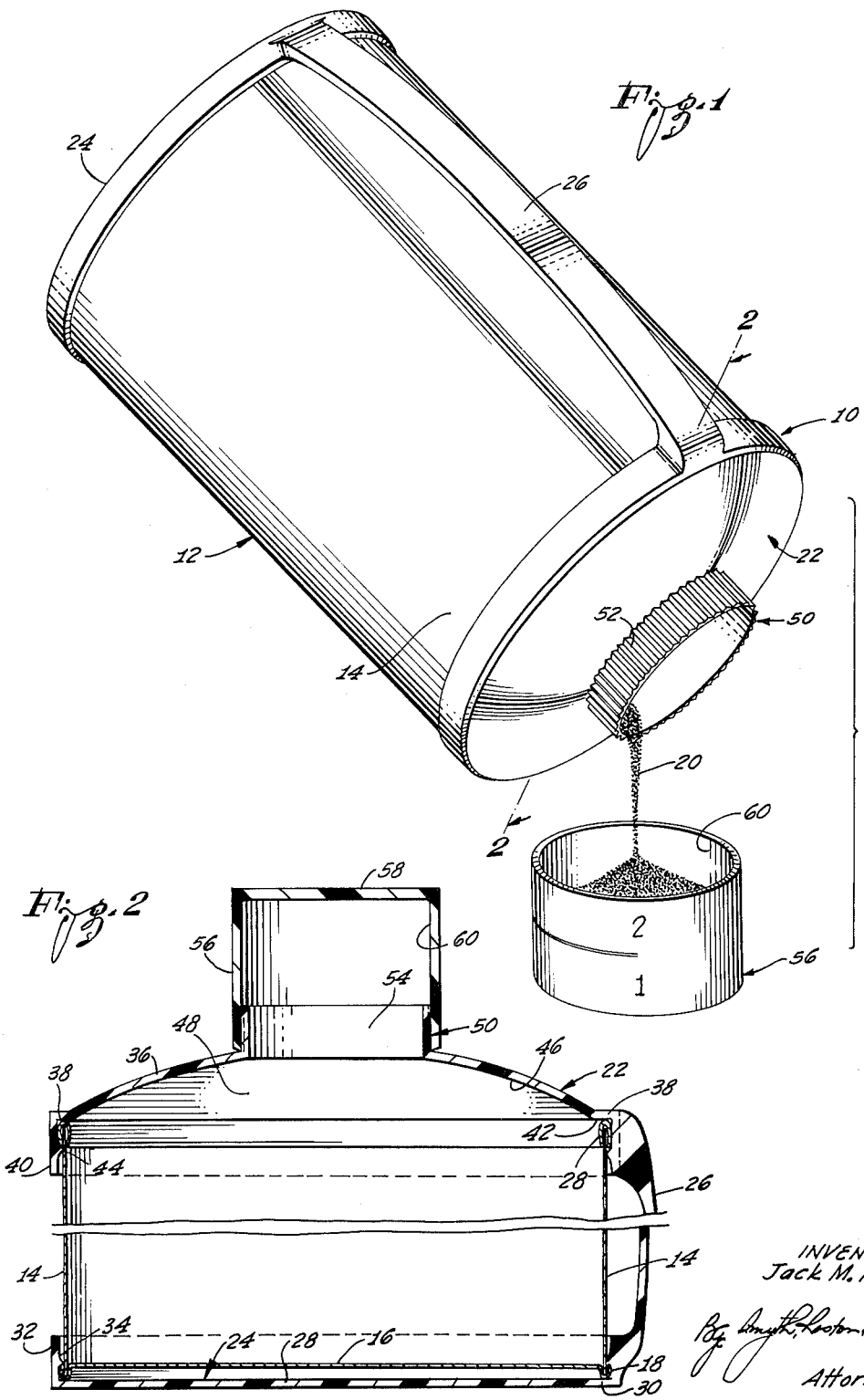
INVENTOR.
Jack M. Nojiri
Attorneys United States Patent Office 3,259,279
Patented July 5, 1966

3,259,279
COFFEE CAN LID AND HANDLE
Jack M. Nojiri, 11906 Exposition Blvd.,
Los Angeles, Calif.
Filed Mar. 6, 1964, Ser. No. 349,804
2 Claims. (Cl. 222—183)

The present invention relates to containers, and more particularly to means for facilitating the use of containers.

At the present time, certain commodities such as coffee are sealed in air tight metal cans for eventual distribution to the consumer. Such containers or cans have one end or lid that is easily removed from the container to obtain access to the contents. This lid normally covers the entire top of the container. As a consequence, when the lid is removed, the entire end of the container is open and the contents such as coffee made readily available. The contents may then be removed by means of a spoon or similar device. It is very frequently difficult or at least inconvenient to remove the entire lid from the container, particularly when the container is of a large size such as a two or three pound can of coffee. In addition, the larger size cans are frequently difficult to handle or hold in one hand, particularly by women having small hands.

Very frequently, the contents of a container are tightly packed into the container. As a result, the contents of the container are flush with the top of the container when the lid is first removed. When the initial portion of the contents are removed, there is a tendency for the remainder of the contents to be disturbed. As a consequence, the remaining contents are loosened and its bulk substantially increased. The amount of disturbance and the increase in bulk is very frequently of such a magnitude that at least a portion of the contents is spilled and wasted.

In addition, containers such as coffee cans and their lids are normally made of metal. As a result of the inherent rigidity of such containers and lids when the lid is returned to a previously open can to reseal the contents, an air tight seal is frequently not provided. In addition, the metal in such containers tends to rust or corrode whereby the containers or lid tend to leave stains or marks. It will thus be seen that the present available containers are not entirely satisfactory for several reasons.

The present invention provides means for overcoming the foregoing difficulties. More particularly, the present invention provides a combination handle and cover which may be employed on a container such as a coffee can so as to make the handling of the can and removal of its contents more convenient. In addition, the present invention provides means which will permit an air tight resealing of a container such as a coffee can after it has been opened. The present invention also provides a combination handle and cover which will prevent any corrosion on the container leaving stain marks.

In one form of the present invention, a combination handle and cover is provided which is molded from a piece of plastic material such as polyethylene whereby it can be mounted on a conventional container and particularly coffee cans. The combination handle and cover includes a pair of end sections and an elongated interconnecting section. The two end sections are disposed on the opposite ends of the interconnecting section and are adapted to fit over the top and bottom of a container such as a coffee can. The bottom end section will form a non-corrodable base upon which the can may rest without causing any form of rust marks, etc. The top section forms a pliable cover that fits onto the top of the can. The interconnecting section preferably has a length which is greater than the height of the can or the space between the two end sections. This will result in the interconnecting section being bowed outwardly from the side of the container or can to form a convenient handle.

An enlarged spout is provided in the center of the top section whereby the contents may be poured from the can or a device such as a spoon may be inserted through the spout to permit the removal of the contents. The top section may also be dished outwardly with a convex exterior surface. This will form a clearance space between the contents of the can and the inside of the top section. As a result of the clearance space between the inside of the top section and the contents of the can, even if the bulk of the contents is increased while removing the initial portions, no spillage will be produced.

These and other features and advantages of the present invention will become readily apparent from the following detailed description of one operative embodiment of the present invention, particularly when taken in connection with the accompanying drawing wherein like reference numerals refer to like parts, and wherein:

FIGURE 1 is a perspective view of a can employing a combination handle and cover embodying one form of the present invention; and FIGURE 2 is a cross-sectional view of the can and the combination handle and cover mounted thereon.

Referring to the drawings in more detail, the present invention is particularly adapted to be embodied in a combination handle and cover 10 for use on a container 12. Although the handle and cover 10 may be used on any type or size of container 12, in the present instance it is shown as being particularly adapted for use on cans 12 of the type used in packaging of coffee. Normally, such a can 12 employs a substantially cylindrical side wall 14. The diameter of the side wall 14 is dependent upon the quantity of coffee to be packaged. However, the diameter is about as large as or larger than the span of the average woman's hand. This is particularly true when the can 12 is designed to contain a quantity on the order of 2 or 3 pounds. As a result, coffee cans 10 are difficult to hold with one hand, particularly in the larger sizes.

A top or lid and a bottom 16 are secured to the opposite ends to the side wall 14. The top or lid and bottom 16 are secured in position on the side wall by forming the periphery thereof over the ends of the cylindrical wall 14. As a result, the opposite ends of the cylindrical wall 14 has a beading 18. This beading 18 projects outwardly a slight distance from the surface of the side wall 14.

Normally, the coffee 20 is very tightly packed into the can whereby the coffee in the can completely fills the can to a level that is substantially coincident with the top of the can 12. As a result, there will be no clearance between the coffee and inside of the lid of the can 12 when the can is filled.

In order to remove the coffee 20 from the can 12, the can 12 is first opened by removing the lid. This is normally accomplished by employing a can opener that will cut the periphery of the lid immediately adjacent to the beading 18. This will cause the entire upper end of the can 12 to be opened whereby all of the contents therein will be exposed. However, the beading 18 will remain intact so as to extend completely around the upper end of the cylindrical wall 14.

The present combination handle and cover 10 includes a top end section 22, a bottom end section 24 and a center section 26 which connect the top and bottom sections 22 and 24 together. The bottom end section 24 has a shape that is substantially the same as the bottom of the can 12 which will normally be round. This section 24 includes a center portion 28 that is surrounded by a circular periphery 30. The peripheral portion 30 is adapted to fit onto the beading 18 around the bottom of the wall 14.

The center portion 28 of the bottom section is preferably substantially flat and extends completely across the bottom 16 of the container 12. The center portion 28 will be slightly spaced from the bottom 16. However, it will form a very stable base for the container 12.

A rim 32 is provided around the periphery 30 and projects upwardly at substantially right angles to the plane of the end section 24. This rim 32 has a surface with an inside diameter that is slightly greater than the outside diameter of the cylindrical side wall 14. As a consequence, the rim 32 may be forced over the outside of the cylindrical side wall 14.

The inside surface of the rim 32 includes a raised rib 34 which projects inwardly. This rib 34 has an inside diameter which is slightly less than the outside diameter of the beading 18. The rib 34 is also separated from the periphery 30 by a distance that is about equal to the height of the beading 18. As a consequence, when the bottom section 24 is forced over the bottom 16 of the can 12, if a person runs his finger or thumb around the periphery 30, the rib 34 will snap over the beading 18 and become locked behind the beading 18. This will be effective to retain the bottom section 24 securely fastened to the bottom of the can 12.

Since the bottom end section 24 has a plane exterior surface, it will provide a broad stable base for supporting the can 12 in an upright position. The end of the can will be spaced from the table or counter upon which it rests. If the bottom section 24 is made from a non-corrodable material such as a plastic, any rusting or corrosion of the can 12 will be prevented from reaching the surface upon which the can 12 is resting. Also, due to the nonresonant nature of plastic, no noise will be created when the can 12 is placed on a hard surface such as a tile counter.

The top end section 22 has a shape that is the same as the top of the can 12 which, in the present instance, is circular. The top section 22 includes a center portion 36 and a periphery 38 that extend circumferentially therearound. The periphery 38 includes a shoulder 42 which is effective to engage and seat upon the beading 18 extending around the top of the can 12.

A rim 40 is provided which extends around the outside of the shoulder 42. This rim 40 includes a substantially cylindrical surface which is substantially normal to the plane of the shoulder 42 and has an inside diameter sufficiently large to pass over the beading 18 on the end of the cylindrical wall 14.

The inside surface of this rim 40 also includes a rib 44 which projects inwardly therefrom. The inside of the rib 44 forms a diameter slightly less than the outside diameter of the beading 18. Also, the rib 44 is separated from the shoulder 42 by a distance that is about equal to the spacing of the beading 18 from the top of the can 12. It may be seen that if the top end section 22 is placed on the can and the finger is run around the periphery 38, the rib 44 will be forced over the beading 18 so that it will snap behind the beading 18 and become locked on the end of the can.

The center portion 36 of the top section 22 may be substantially planar similar to the center portion 28 of the bottom section 24. However, in the present instance, the center portion 36 is dished to project outwardly and form a convex exterior surface. The inside surface 46 of the center portion 36 will be concave and will thereby form a clearance space 48 between the inside surface 36 and the plane of the top of the upper beading 18. Thus, even if the can 12 is filled with a material such as coffee that completely fills the can and extends to the plane of the top of the can, there will still be an enlarged clearance space 48 between the coffee and the surface 46.

In addition, the center portion 36 may include an opening to permit removal of the contents of the can. In the present instance, this opening is provided by a spout 50 consisting of a cylindrical projection. The spout 50 is formed integral with the top section 22 and projects outwardly from the center portion 36. The spout 50 includes a substantially cylindrical exterior surface 52 and an enlarged opening 54. The opening 54 extends through the spout and exposes the clearance space 48 and the contents of the container 12. Although the spout 50 may be employed for pouring the contents such as coffee from the container 12, it has been found desirable for the spout 50 to be of a sufficiently large size to permit a spoon or similar measuring device to be inserted through the spout 50 and into the contents for removing from the container 12.

In order to reseal the container and protect its contents from the atmosphere, a suitable cap 56 may be provided. In the present instance, this cap 56 includes a substantially plane end portion 58 and a substantially cylindrical portion 60. The cylindrical portion 60 fits over the exterior of the spout 50 and has an inside diameter equal to or slightly less than the diameter of the surface 52. This will form an air tight seal and provide a friction fit that will maintain the cap 56 in position. If it is desired, the cap 56 may be graduated in suitable units such as tablespoons to facilitate measuring the contents when they are removed.

The center section 26 may be a substantially flat member having a shape like a band or strap. The opposite ends of the section are formed integral with the end sections 22 and 24 so as to be permanently secured thereto. The length of the section 26 is preferably slightly greater than the height of the container 12 or the distance between the two end sections 22 and 24 when they are positioned on the container 12. This excessive length will cause the center section 26 to bow outwardly from the container 12 and form a handle. A person may thus grasp the handle very conveniently and carry the can 12 with one hand even though the can 12 is of a size that is greater than the span of a person's hand.

Although the present combination handle and cover 10 may be fabricated from any suitable material, it is preferably molded from a plastic material such as a polyethylene. Normally, the combination handle and cover 10 is molded so that it may be flattened out so as to be packaged against a flat piece of cardboard, etc. At the same time, it may be formed into the general arrangement shown in the drawings. In order to employ the present handle-cover 10, the top or lid of the can 12 is first removed in a conventional manner. The top and bottom end sections 22 and 24 are then placed on the top and bottom of the can 12 and forced thereagainst until the ribs 34 and 44 snap over the beadings 18 and lock the handle-cover 10 in position. The contents of the can 12 may then be removed through the spout 50 by pouring or by means of a spoon inserted through the spout.

It will thus be seen that a combination handle and cover 10 has been provided that is particularly adapted for use on containers such as coffee cans. The plastic base formed by the bottom end section 24 will be effective to provent rust marks, etc., formerly resulting from corroded or rusted coffee cans. In addition, the handle will provide a convenient means of carrying a can or holding it while the contents such as coffee are being removed.

Moreover, since the plastic spout 50 and the cap are resiliently deformable, they will be effective to move into intimate contact with the supporting structure whereby an air tight seal will always be formed to effectively protect the coffee within the can. In addition, when the can 12 is initially opened and the top end section 22 is placed on the can, the clearance space 48 will permit the contents to be disturbed to any desired extent. More particularly, if in removing the initial portion of coffee from a can 12, the coffee is bulked up it will not be spilled from the spout 50. In the event it is desired to pour the contents from the can 12, it may be poured through the spout 50 and into the cap 56 which may be graduated to facilitate measuring the quantity of coffee removed from the can 12.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A combination handle and cover for use on containers having a substantially cylindrical side wall, a closed bottom on the lower end of the side wall, an open top on the upper end of the side walls and a beading on said side wall adjacent each end, said combination handle and cover including:

top and bottom covers,
   a peripheral rim on each of said covers, said peripheral rims being disposed at substantially right angles to the planes of the covers and extending circumferentially therearound, each of the rims having an inside diameter just sufficiently large to fit over the exterior of the cylindrical side wall,
   fastening means on the inside of each of the rims positioned to fit over the beadings and retain the covers in position on the opposite ends of the container,
   a handle member extending between said covers, said handle member having a length greater than the space between the covers when they are seated on the ends of the side wall to thereby bow outwardly from the cylindrical wall to form a handle,
   an outlet opening in the top cover to permit the removal of the contents of the container, and
   a removable cap disposed in said opening for sealing the opening.

2. A combination handle and cover for use on containers having a substantially cylindrical side wall, a closed bottom on the lower end of the side wall, an open top on the upper end of the side wall and a beading on said side wall adjacent each end, said combination handle and cover including:

a top cover,
   a bottom cover,
   a rim on each of said covers extending circumferentially therearound at substantially right angles to the covers so as to just fit over the exterior of the cylindrical side wall,
   fastening means on the inside of the rims positioned to engage the beadings and secure the covers in position on the opposite ends of the container,
   a flexible handle member secured to each of said covers to bow outwardly from the cylindrical wall to form a handle,
   said cover being outwardly convex to form a clearance space between the inside of the top cover and the contents of the container,
   a spout on the top cover to form an opening to permit removal of the contents of the container, and
   a removable cap secured to said spout for sealing the opening.

References Cited by the Examiner

UNITED STATES PATENTS

| | | | |
|---|---|---|---|
| 2,031,312 | 2/1936 | Horlick | 220—42 |
| 2,612,765 | 10/1952 | Gorey | 222—183 |
| 2,630,237 | 3/1953 | Rosenlof | 220—42 |
| 2,782,614 | 2/1957 | Currie | 220—85 |
| 2,786,607 | 3/1957 | Moore et al. | 222—183 |
| 2,838,202 | 6/1958 | Huether. | |

THERON E. CONDON, *Primary Examiner.*

R. H. SCHWARTZ, *Assistant Examiner.*